April 26, 1960 K. W. HALLDEN 2,933,940
BALANCED-TORQUE DRIVE OF A ROTARY SYSTEM AT
CYCLICALLY CONTINUOUSLY VARYING VELOCITY
Filed July 1, 1957 3 Sheets-Sheet 1

INVENTOR.
Karl W. Hallden
BY
Attorney.

April 26, 1960

K. W. HALLDEN 2,933,940

BALANCED-TORQUE DRIVE OF A ROTARY SYSTEM AT
CYCLICALLY CONTINUOUSLY VARYING VELOCITY

Filed July 1, 1957

INVENTOR.
Karl W. Hallden

BY
Attorney.

United States Patent Office 2,933,940
Patented Apr. 26, 1960

2,933,940

BALANCED-TORQUE DRIVE OF A ROTARY SYSTEM AT CYCLICALLY CONTINUOUSLY VARYING VELOCITY

Karl W. Hallden, Thomaston, Conn., assignor to The Hallden Machine Company, Thomaston, Conn., a corporation of Connecticut Application July 1, 1957, Serial No. 668,956

5 Claims. (Cl. 74—437)

This invention relates to a balanced torque drive of a rotary system at continuously varying velocity.

The present invention is applicable especially, though not exclusively, to rotary shears for severing continuously fed stock, such as sheet metal, for example, into variable lengths. Rotary shears of this type have a pair of rotary shear drums with peripheral companion shear blades which cooperate on the drive of the drums in severing stock fed between them, and a flywheel adapted to counterbalance the shear drums, with the drums and flywheel having equal inertias. The drive of the shear drums and flywheel is usually variable to different r.p.m. of the drums for the severance of continuously fed stock into different lengths, and the drive customarily includes eccentric surge gears which are adjustable relative to the shear drums for momentary synchronization of the peripheral drum speeds with the continuously fed stock at the times of cut of any desired stock lengths. Accordingly, the shear drums and flywheel surge constantly between minimum and maximum speeds, and the ensuing alternating positive and negative torque surges in the shear drums are counteracted by alternating negative and positive torque surges in the flywheel.

To counteract the torque surges in the shear drums with equal but opposite torque surges in the flywheel, it has been customary to interpose in their drive, as a last stage thereof, a driving elliptical gear and two driven elliptical gears in mesh with the driving gear and drivingly connected with the shear drums and flywheel, respectively, with these gears being adjustable relative to the shear drums for synchronization purposes as aforementioned. It has been found, however, that these elliptical gears fall considerably short of producing equal and opposite torque surges in the shear drums and countering flywheel, with resultant pulsating feed back of excessive unbalanced torque into the drum drive and the rest of the shear.

Lately, there has become known a shear drive disclosed in the U.S. patent to Orr, No. 2,861,635, dated November 25, 1958, in which there are interposed two successive stages of elliptical gears of which the gears of one stage modify the torque effect of the gears of the other stage upon the shear drums and flywheel so that the torque surges, and hence also the torques, in the shear drums and in the countering flywheel are at any instant equal and opposed to each other. However, while Orr thus produces equal but opposite torques and torque surges at any instant in the shear drums and countering flywheel, this involves the use of two successive stages of elliptical gears in the drive with ensuing increase in the cost and bulk of the shear and complexity in installing these successive elliptical gear stages in existing shears.

It is, therefore, an object of the present invention to provide in the drive of a rotary utility system and a rotary counter system, such as companion shear drums and a countering flywheel, for example, a single stage of three surge gears with a driving gear and two driven gears in mesh with the driving gear and drivingly connected with the rotary systems, respectively, with these gears so designed that they alone produce in these systems equal but opposed torques and torque surges at any instant, thereby to achieve with but one gear stage of a minimum number of gears the same result achieved by Orr with two gear stages of almost twice the number of gears.

It is another object of the present invention to design the three surge gears of the aforementioned single stage so that the torques in the driven gears thereof vary as two harmonic curves, respectively, such as sine curves, for example, which are 180° out of phase with each other for each revolution of the driving gear at any given speed of the latter, thereby to achieve equal, but opposed, torques and torque surges in these driven gears at any instant as desired.

Other objects and advantages will appear to those skilled in the art from the following, considered in conjunction with the accompanying drawings.

In the accompanying drawings, in which certain modes of carrying out the present invention are shown for illustrative purposes:

Figure 1:
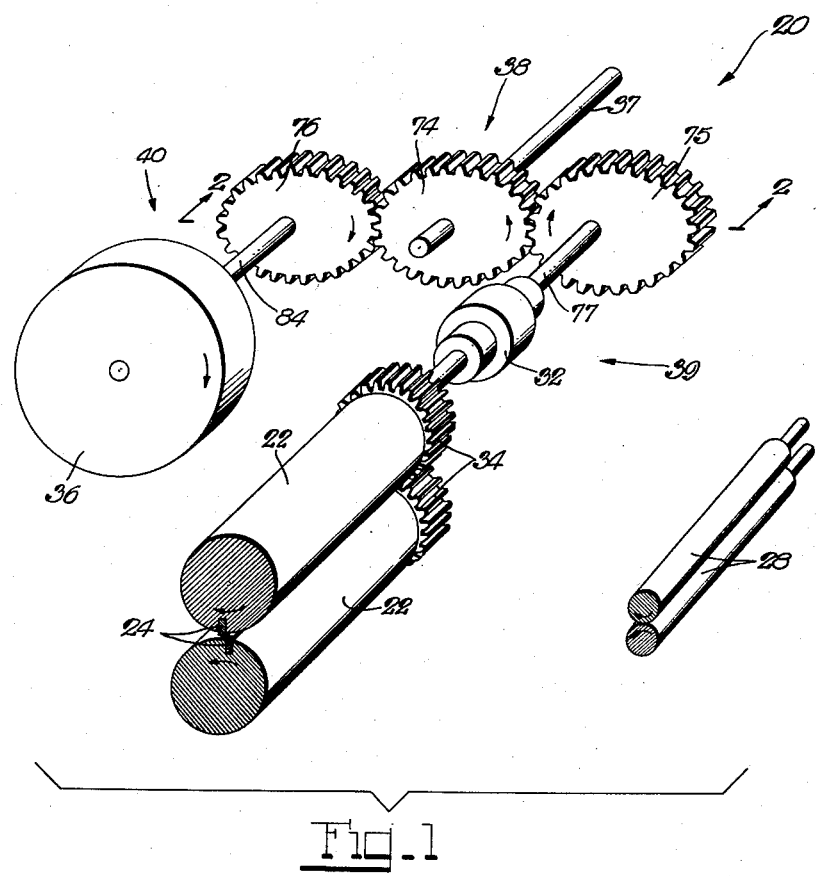
Fig. 1 is a fragmentary diagrammatic perspective view of an exemplary rotary shear embodying the present invention.

Referring to the drawings, and more particularly to Fig. 1 thereof, the reference numeral 20 designates an exemplary conventional shear having rotary companion drums 22 which are provided with longitudinal shear blades 24, respectively, that cooperate on the drive of the drums 22 to sever stock fed between the latter. The shear 20 further provides a drive for the shear drums, including as a presently last stage thereof a gear system or synchronizing mechanism 38. The shear 20 also provides cooperating feed rolls 28 which may be power-driven to feed continuous stock to-be-severed, such as sheet metal, for example, to the shear drums 22 at a constant rate.

The drum drive includes a drive shaft 37 that is the input shaft of the gear system or stage 38 which includes a driving gear 74 on the drive shaft 37 and a driven gear 75 on a shaft 77. The shaft 77 is, through intermediation of an angularly adjustable coupling 32, drivingly connected with one of the shear drums 22, and both shear drums are connected by gears 34 for their joint drive in opposite directions.

The gears 74, 75 of the gear system 38 are surge gears, so that the shear drums 22 are driven in recurring speed surges with ensuing recurring torque surges in the shear drums. To counteract the recurring torque surges in the shear drums 22, there is provided a flywheel 36 on a rotary shaft 84 which also carries another surge gear 76 of the gear system 38 in mesh with the driving gear 74 thereof.

In operation of the shear, i.e., with the drum drive and the feed-roll drive operative, continuous stock is fed at a constant rate by the feed rolls 28 to the shear drums 22, with the shear blades 24 cooperating, presently once during each revolution of the shear drums, to cut the stock into predetermined lengths. To prevent marring or buckling of the fed stock by or under the action of the turning shear blades 24 thereon, the surge gears of the gear system 38 are, at the coupling 32, so angularly adjusted relative to the shear drums 22 that the peripheral speeds of the latter, and more particularly that of their shear blades 24, is at the time of each stock severance by the latter, synchronized with the feed of the stock by the feed rolls 28.

Assuming now that it is desired to cut continuous stock into different lengths, this may, for example, be achieved by varying or adjusting the drum drive to a corresponding r.p.m. of the shear drums without in any way varying the drive of the feed rolls 28. However, with the drum drive thus adjusted to the correct r.p.m. of the shear drums for the desired lengths of stock cuts, there still remains the task of synchronizing the shear blades 24 with the feed of the stock at the times of cut, and this is achieved by appropriate angular adjustment of the gears of the gear system 38 relative to the shear drums, as will be readily understood.

The surge gears 74, 75 and 76 of the present invention are constantly varying ratio gears, with the driven gears 75 and 76 being identical and so meshed with the driving gear 74 that the shear drums 22 are accelerated and decelerated as, and at the same rate at which, the flywheel 36 is decelerated and accelerated, respectively. The exemplary shear 20 thus provides two rotary surge systems, namely a utility system 39 comprising the shear drums 22 with their gears 34, coupling 32 and the driven gear 75 with its shaft 77, and a counter system 40 comprising the flywheel 36, driven gear 76 and shaft 84. These two systems 39 and 40 are made of equal inertias so that, by virtue of their above-mentioned equal and opposed acceleration and decleration at any instant and in accordance with the torque equation $T = I \times \alpha$ (where $I$ denotes inertia and $\alpha$ denotes acceleration), the torque in either system is equal and opposed to the torque in the other system at any instant and the torque surges in both systems are at any instant equal and opposed to each other.

Figure 2:
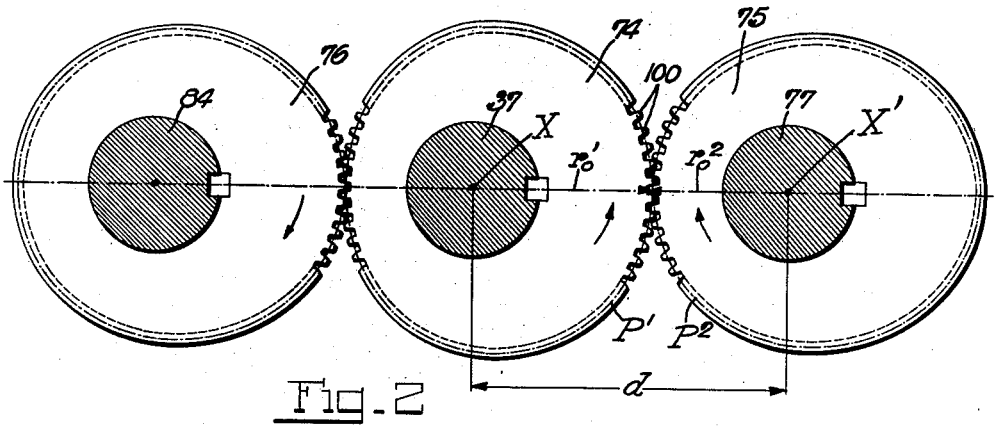
Fig. 2 is an enlarged section taken on the line 2—2 of Fig. 1, and showing a gear system embodying and being designed in accordance with the present invention.

Assuming now that on the adjustment of the shear for the cutting of the shortest possible length of cut, for example, the shear drums are at the moments of cut synchronized with the fed stock when the driven gear 75 of the synchronizing mechanism 38 has at the same moments preferably advanced somewhat beyond the start of each of its accelerating half cycles or revolutions, i.e., is at these moments displaced somewhat more than 180 degrees clockwise from the position shown in Fig. 2 on assuming that the same is normally driven clockwise, it stands to reason that synchronization of the shear drums with the fed stock at the momens of stock cuts of any of the remaining lengths of cut of which the shear is capable must occur within the remainder of each accelerating half cycle or revolution of this driven gear 75. Hence, it is obvious that the ratio of the maximum and minimum instantaneous velocities of the driven gear 75, hereinafter called "nominal" velocity ratio, must be selected so as to permit synchronization of the shear drums for any length of cut within each accelerating half cycle or revolution of this gear. The maximum instantaneous velocity of the driven gear 75 ratiowise with respect to the constant-speed driving gear 74 for any particular cut-length adjustment of the shear, conveniently called maximum instantaneous velocity ratio of these gears, is as $r_0^1$ to $r_0^2$ or $r_0^1/r_0^2$, where $r_0^1$ and $r_0^2$ are the maximum and minimum radii of the gears 74 and 75, respectively, extending from their rotary axes X and X' to their respective pitch lines P¹ and P². On the other hand, the minimum instantaneous velocity of the driven gear 75 ratiowise with respect to the driving gear 74, conveniently called minimum instantaneous velocity ratio of these gears, is as $r_0^2$ to $r_0^1$ or $r_0^2/r_0^1$. Accordingly, the aforementioned nominal velocity ratio $n$ of the driven gear 75 is equal to the maximum instantaneous velocity ratio divided by the minimum instantaneous velocity ratio of the gears 74 and 75, or $$n = \frac{\frac{r_0^1}{r_0^2}}{\frac{r_0^2}{r_0^1}}$$

hence, $$n = \left(\frac{r_0^1}{r_0^2}\right)^2$$

Accordingly, on selecting a suitable nominal ratio $n$ for a required synchronization range, the maximum and minimum instantaneous velocity ratios of the gears 74 and 75 may readily be determined, for the maximum instantaneous velocity ratio is $r_0^1/r_0^2$ which, in turn, equals $\sqrt{n}$ according to the above formula for $n$, while the minimum instantaneous velocity ratio is $r_0^2/r_0^1$ which, in turn equal $1/\sqrt{n}$. It is thus obvious from the foregoing that the ratio of the lengths of $r_0^1$ and $r_0^2$ may be determined for the selected nominal velocity ratio, and the actual lengthwise dimensions of $r_0^1$ and $r_0^2$ may be determined on selecting an appropriate center distance $d$ between the gears 74 and 75.

While it is, of course, an objective to design the gears 74 and 75 so that their velocity ratio varies continuously during each cycle or revolution thereof in order to permit synchronization of the shear drums with the fed stock for cutting stock of all possible lengths, it is the prime objective to balance the inevitable torque surges induced in the driven gear 74 and in the shear drums 22, 22 by virtue of their continuous acceleration and deceleration. Accordingly, it is the prime objective to design the aforementioned utility and counter systems 39 and 40 so that their respective developed torques are at any instant of their drive equal in magnitude, but opposed to each other.

Basic for the following considerations toward achieving this prime objective of equal and opposed torques in these rotary systems at any instant of their drive is the torque equation according to which torque equals inertia times acceleration, or $T = I\alpha$, where $I$ denotes inertia and $\alpha$ denotes acceleration. Hence, if the rotary utility and counter systems are designed so that their inertias are equal, this prime objective will be achieved on designing the gears 74, 75 and 76 so that the acceleration of the rotary utility system is at any instant equal in magnitude to, but varies oppositely as, the acceleration of the rotary counter system.

The design of the rotary utility and counter systems so that their inertias are equal is a simple matter and, hence requires no further explanation.

Thus, it is the next objective to design the gears 74, 75 and 76 so that the gears 75 and 76 will, on their drive by the gear 74, have at any instant equal, but oppositely varying, acceleration within the aforementioned instantaneous maximum and minimum velocity ratios which must be the same for both pairs of gears 74, 75 and 74, 76 as will appear obvious hereinafter. With this in mind, the gear 74 and, for example, the gear 75 are designed so that the acceleration of the driven gear 75 of the rotary utility system, if plotted throughout 360 degrees rotation of the input or drive shaft 37 from a zero position (Fig. 2), will define a sine curve. Then, by making the other driven gear 76 of the rotary counter system identical with the gear 75, and meshing it with the common driving gear 74 diametrically opposite from the driven gear 75 and displacing it 180 degrees from the angular position of the latter gear, the acceleration of the other driven gear 75, if plotted throughout 360 degrees displacement of the drive shaft 37 from the same zero position, will define a sine curve which is symmetrical with the sine acceleration curve of the driven gear 75 of the rotary utility system, about the line of unity U (Fig. 5) which coincides with the instantaneous accelerations, presently zero, of the gears 75 and 76 in the aforementioned zero position of the drive shaft 37. This is clearly shown in Fig. 5 where the full-line and dotted-line sine curves S and S' define the acceleration of the gears 75 and 76, respectively, through 360° displacement, each starting at the zero degree position of the drive shaft 37 as shown in Fig. 2. With the acceleration of the driven gears 75 and 76 being thus at any instant equal, but varying oppositely to each other, and with the inertias of the rotary utility and counter systems being made equal as described hereinbefore, it stands to reason that the torques in the rotary utility and counter systems vary according to the same sine curves S and S', respectively (Fig. 5), with the result that these torques are of equal magnitude, but oppose each other, in any instantaneous relative angular disposition of the driven gears 75 and 76, wherefore there is to all practical intents and purposes no feedback of torque into the drive shaft 37 and the rest of the exemplary variable-speed drive of the shear.

Figure 5:
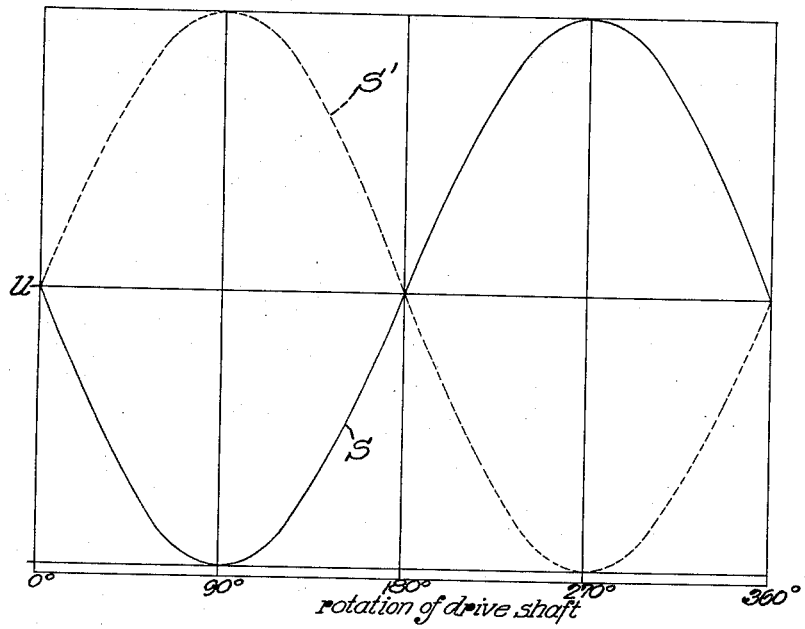
Fig. 5 is a graph depicting featured torque and acceleration characteristics of certain rotary systems of the exemplary shear.
Figure 6:
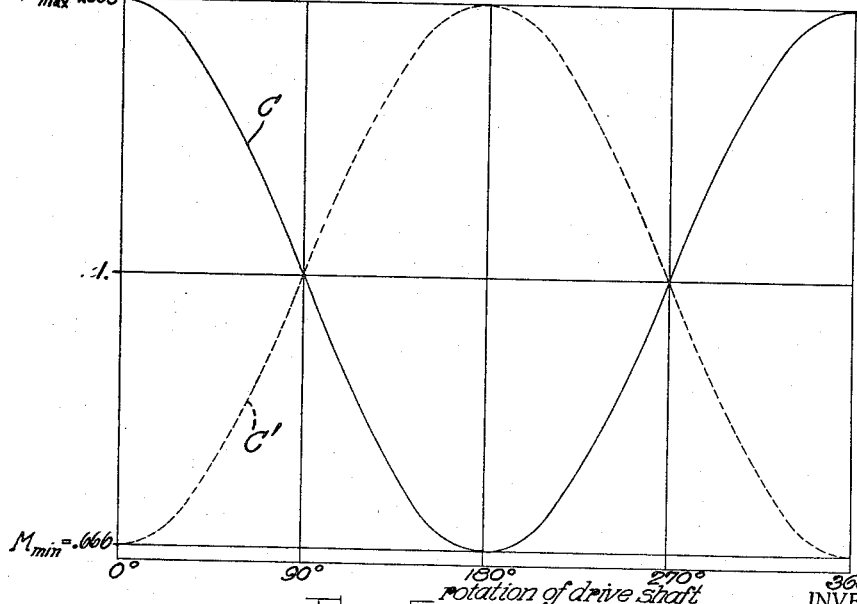
Fig. 6 is a graph depicting featured velocity ratios of the same rotary systems of the exemplary shear.

It has been explained hereinbefore that the synchronization range of the shear requires certain instantaneous maximum and minimum velocity ratios of the gears 74 and 75. It is a further prerequisite for the design of the gears 74 and 75 that the acceleration of the gear 75 for each cycle or revolution thereof must follow a sine curve as explained just above. Insofar as the acceleration of the gear 75 in this sine fashion is concerned, it is a known fact that such is achieved if the instantaneous velocity ratio of the gears 74 and 75 varies throughout each cycle or revolution thereof according to a cosine curve, wherefore it is the next objective to define the pitch lines $P^1$ and $P^2$ of the respective gears 74 and 75 so that the instantaneous velocity ratio of these gears varies in this cosine fashion. Thus, the full-line cosine curve C in Fig. 6 represents the instantaneous velocity ratio of the gears 74, 75 throughout 360 degrees rotation starting at 0 degrees from the zero position of the drive shaft 37 shown in Fig. 2. This cosine curve C (Fig. 6) indicates that the instantaneous velocity ratio of these gears decreases for the first 180 degrees rotation of the drive shaft 37 from its zero position in Fig. 2, and this may clearly be perceived from the latter figure. The cosine curve C (Fig. 6) further indicates that the instantaneous velocity ratio of these gears increases for the second half revolution of the drive shaft 37, and this may also be clearly perceived from Fig. 2. In order to achieve the aforementioned equal and opposed torque variations in the rotary utility and counter systems according to symmetrical sine curves (Fig. 5), the instantaneous velocity ratio of the gears 74, 76 for the rotary counter system must also vary according to the dotted-line cosine curve C' (Fig. 6) which, moreover, must be symmetrical with the cosine curve C about the line of unity 1.

Figure 3:
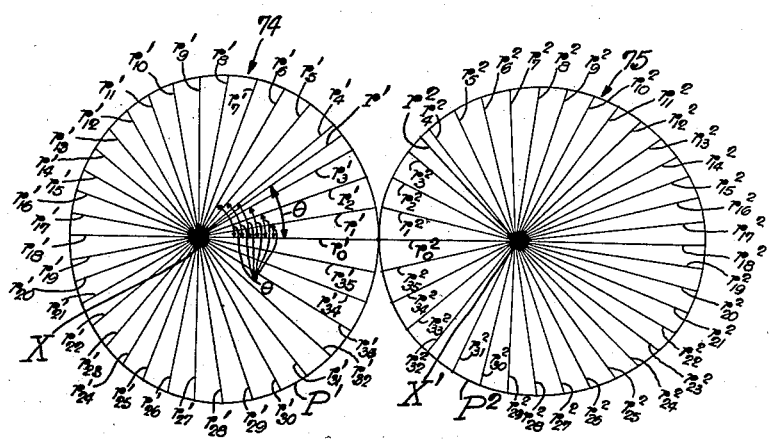
Fig. 3 illustrates the development of the pitch lines of certain gears of the gear system of Fig. 2.
Figure 4:
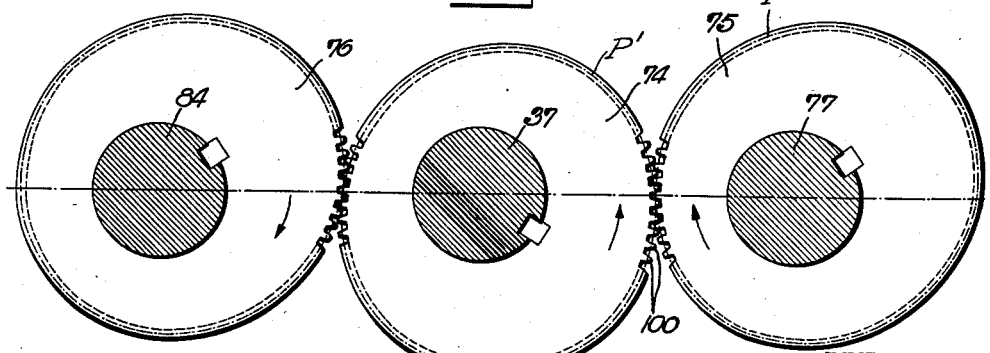
Fig. 4 is a section similar to Fig. 2, and showing the gears of the featured system in different relative angular disposition.

Since the instantaneous velocity ratio of the gears 74, 75 varies according to a cosine curve, as explained, it stands to reason that the ratios of the lengths of the coordinated radii of these gears, which are continuous and in linear alignment with each other once during each revolution of these gears, vary according to the same cosine curve. Hence, the ratio of the lengths of the coordinate radii of the gears 74 and 75 at any angle from the maximum radius $r_0^1$ of the driving gear 74 is a function of the cosine of this angle. Thus, while the instantaneous velocity ratio $M_s$ of the gears 74, 75 of the rotary utility system at their point of mesh at any angle from the maximum radius $r_0^1$ of the driving gear 74 is equal to the ratio of the then continuous and linearly aligned radii of these gears, the same velocity ratio may be expressed as a function of the cosine of the particular angle. Thus, $$M_s = \frac{r^1}{r^2}$$

where $r^1$ and $r^2$ are the coordinate radii of the gears 74 and 75, respectively, with the radius $r^1$ of the gear 74 spaced any given angle $\theta$ from the maximum radius $r_0^1$ thereof (Fig. 3). However, the same $M_s$ is also equal to $k$ cosine $\theta + 1$, where $k$ is a constant to be explained. The value of $+1$ has been added to this equation in order to obtain the imperative unity or 1 for the $M_s$ values at $\theta$ equal to 90° and 270° of the cosine curves in Fig. 6, for without this addition to the equation, $M_s$ at 90 and 270 degrees would be zero because the cosines of these angles are zero.

Insofar as the determination of the value of $k$ for any selected nominal velocity ratio of the driven gear 75 is concerned, it is known that the nominal velocity ratio of this gear is $$n = \frac{M_{max}}{M_{min}}$$

where $M_{max}$ and $M_{min}$ are the maximum and minimum instantaneous velocity ratios of the gears 74 and 75. It is also known that $M_{max}$ occurs when the angle $\theta$ is zero (Fig. 3), i.e. when the maximum and minimum radii $r_0^1$ and $r_0^2$ of the gears 74 and 75 are continuous and in linear alignment with each other. Accordingly, the value $k$ cosine $\theta$ for $M_{max}$ equals $k$, for the cosine of 0° is 1. It is further known that $M_{min}$ occurs when the angle $\theta$ is 180° (Fig. 3), i.e. when the minimum and maximum radii $r_{18}^1$ and $r_{18}^2$ of the gears 74 and 75, respectively, are continuous and in linear alignment with each other. Accordingly the value $k$ cosine $\theta$ for $M_{min}$ equals $-k$, because the cosine of 180° is $-1$. Hence, the nominal velocity ratio $$n = \frac{M_{max}}{M_{min}} = \frac{1+k}{1-k}$$

The next objective is to arrive at a simple formula in which $k$ is expressed solely with reference to the selected nominal velocity ratio $n$ of the gear 75. It is already known that $$n = \frac{1+k}{1-k}$$

hence $n(1-k) = 1+k$, or $n-k = 1+k$. From this follows that $n-1 = k \times kn$, and $k(1+n) = n-1$, wherefore $$k = \frac{n-1}{n+1}$$

It has already been explained that the ratio of the lengths of any coordinate radii $r^1$ and $r^2$ of the gears 74 and 75 at an angular distance $\theta$ of the respective radius $r^1$ of the gear 74 from the maximum radius $r_0^1$ thereof is equal to $k$ cosine $\theta + 1$. It is also known that the combined length of any coordinate radii $r^1$ and $r^2$ of the gears 74, 75 is equal to the selected center distance $d$ of the gears 74 and 75. Thus, $$\frac{r^1}{r^2} = k \text{ cosine } \theta + 1$$

where $\theta$ is the angle of displacement of $r^1$ from the maximum radius $r_0^1$ of the driving gear 74. Also $r^1 + r^2 = d$ (center distance of gears 74, 75). The object now is to arrive at a formula for the dimensional value of $r^1$ for as many angles $\theta$ as are required accurately to define the pitch line $P^1$ of the driving gear 74. Thus, since $r^1 + r^2 = d$, $r^2 = d - r^1$. Hence, $$\frac{r^1}{d - r'} = k \text{ cosine } \theta + 1$$

or $r^1 = (d - r^1) \times (k \text{ cosine } \theta + 1)$. From this follows:
$r^1 = d(k \text{ cosine } \theta + 1) - r^1(k \text{ cosine } \theta + 1)$, or
$r^1 + r^1(k \text{ cosine } \theta + 1) = d(k \text{ cosine } \theta + 1)$, or
$r^1 + r^1 k \text{ cosine } \theta + r^1 = d(k \text{ cosine } \theta + 1)$, or
$2r^1 + r^1 k \text{ cosine } \theta = d(k \text{ cosine } \theta + 1)$, or
$r^1(2 + k \text{ cosine } \theta) = d(k \text{ cosine } \theta + 1)$, and hence, $$r^1 = \frac{d(k \text{ cosine } \theta + 1)}{2 + k \text{ cosine } \theta}$$

Since $r^2=d-r^1$ as explained above, the radius $r^2$ of the driven gear 75 coordinate with each radius $r^1$ of the driving gear 74 is $$r^2=d-\frac{d(k\cos\theta+1)}{2+k\cos\theta}$$

It should be noted from this formula that the dimensional value of $r^2$ is referred to the angle $\theta$ at which the coordinate radius $r^1$ of the driving gear 74 is spaced from the maximum radius $r_0^1$ thereof.

With the above formulas for $r^1$ and $r^2$, both gears 74 and 75 may readily be designed. Since the angle $\theta$ refers to the driving gear 74, its pitch line P' will first be determined and embodied in a gear. For example, this pitch line P' may be plotted directly on a blank from which the gear is to be cut. Thus, the radius $r^1$ for as many angles $\theta$ as will produce an accurate outline of the pitch P' will be laid out (Fig. 3). After having the pitch line P' outlined in this exemplary fashion on the blank of the gear 74, an additional line parallel throughout to the pitch line P' may be provided on the blank to define the outer periphery or final contour of the latter. The blank may then be machined to its exact contour, whereupon the teeth 100 are cut therein in any conventional manner, preferably by accurate generation.

The driven gear 75 of the rotary utility system is a conjugate gear. Its pitch line $P^2$ may accurately be outlined by laying out as many radii $r^2$ as are necessary for this purpose. The lengths of $r^2$ may be obtained quite simply by subtracting the coordinate radii $r^1$ from the known center distance of the gears. However, since each radius $r^2$ of the driven gear 75 has to be laid out with reference to the angle $\theta$ of the coordinate radius $r^1$ of the driving gear 74, it stands to reason that only by laying out many radii $r^2$ in close peripherally spaced relation with each other and with the coordinate radii $r^1$ of the driving gear 74 will the pitch line $P^2$ of the driven gear 75 be outlined accurately. Of course, and as already mentioned, the driven gear 76 of the rotary counter system is exactly like the driven gear 75 of the rotary shear system.

Following is a description of an exemplary layout in Fig. 3 of the pitch line P' of the exemplary common driving gear 74 of Fig. 2. Thus, assuming that the nominal velocity ratio $n$ of the driven gear 75 is 2 to 1, it follows from the foregoing formula $$k=\frac{n-1}{n+1}$$

that $$k=\frac{2-1}{2+1}=\frac{1}{3}$$

It is further assumed that the center distance $d$ between the gears 74 and 75 is, for example, 10 inches which fixes the center axes X and X' of these gears. Next, these center axes X and X' are connected by a straight line which constitutes the combined length of the maximum and minimum radii $r_0^1$ and $r_0^2$ of the respective gears 74 and 75, whereupon in the example shown in Fig. 3 there are laid out radii $r_1^1$ to $r_{35}^1$ at 10 degrees spacing from each other and from the maximum radius $r_0^1$. It has been found that, with the above exemplary values for $k$ and $d$, the aforementioned formula for $r^1$ will give in the following list the exact lengths of $r_0^1$ to $r_{35}^1$ on the assumption that $\theta$ is zero for $r_0^1$ and that the angles $\theta$ for all other radii $r_1^1$ to $r_{35}^1$ are equal to their respective angular displacements from $r_0^1$, presently in counter-clockwise direction. Noted in the same list below are the lengths of the coordinate radii $r_0^2$ to $r_{35}^2$ of the conjugate gear 75 (Fig. 2), the pitch line $P^2$ of which is also outlined in Fig. 3. Thus, the lengths of these radii, expressed in inches, are as follows:

$r_0^1=5.714$
$r_1^1=r_{35}^1=5.705$
$r_2^1=r_{34}^1=5.677$
$r_3^1=r_{33}^1=5.631$
$r_4^1=r_{32}^1=5.566$
$r_5^1=r_{31}^1=5.484$
$r_6^1=r_{30}^1=5.385$
$r_7^1=r_{29}^1=5.268$
$r_8^1=r_{28}^1=5.141$
$r_9^1=r_{27}^1=5$
$r_{10}^1=r_{26}^1=4.851$
$r_{11}^1=r_{25}^1=4.697$
$r_{12}^1=r_{24}^1=4.545$
$r_{13}^1=r_{23}^1=4.400$
$r_{14}^1=r_{22}^1=4.268$
$r_{15}^1=r_{21}^1=4.156$
$r_{16}^1=r_{20}^1=4.071$
$r_{17}^1=r_{19}^1=4.018$
$r_{18}^1=4$ $r_0^2=4.285$
$r_1^2=r_{35}^2=4.295$
$r_2^2=r_{34}^2=4.322$
$r_3^2=r_{33}^2=4.369$
$r_4^2=r_{32}^2=4.434$
$r_5^2=r_{31}^2=4.516$
$r_6^2=r_{30}^2=4.615$
$r_7^2=r_{29}^2=4.730$
$r_8^2=r_{28}^2=4.858$
$r_9^2=r_{27}^2=5$
$r_{10}^2=r_{26}^2=5.149$
$r_{11}^2=r_{25}^2=5.302$
$r_{12}^2=r_{24}^2=5.454$
$r_{13}^2=r_{23}^2=5.599$
$r_{14}^2=r_{22}^2=5.732$
$r_{15}^2=r_{21}^2=5.843$
$r_{16}^2=r_{20}^2=5.928$
$r_{17}^2=r_{19}^2=5.982$
$r_{18}^2=6$

While it has been stated hereinbefore that the maximum and minimum instantaneous velocity ratios $M_{max}$ and $M_{min}$ of the gears 74, 75 are equal to $\sqrt{n}$ and $1/\sqrt{n}$, respectively, with $n$ being the nominal velocity ratio of the gear 75, the cosine curve of the instantaneous velocity ratios of the gears 74 and 75, if based on the $M_{max}$ and $M_{min}$ values obtained from $\sqrt{n}$ and $1/\sqrt{n}$, would not pass through the line of unity or 1 at 90 and 270 degrees. Yet, the coordinate radii of the gears 74 and 75 at the angles $\theta$ from the maximum radius $r_0^1$ of the driving gear 74 have been calculated on the basis of the instantaneous velocity ratio cosine curve passing through the line of unity or 1 at 90 and 270 degrees, as it must in order to achieve the final objective of equal, but opposed, torques in the rotary utility and counter systems at any instant of their drive. Hence, while for an exemplary nominal velocity ratio of 2 the maximum and minimum instantaneous velocity ratios would be 1.414 and .707, respectively, according to the above formulas of $\sqrt{n}$ and $1/\sqrt{n}$, respectively, they are in reality different than 1.414 and .707 and must be such that their mean value equals 1. Hence, for an exemplary nominal velocity ratio $n$ of 2, and in accordance with the formula $$n=\frac{M_{max}}{M_{min}},\ 2=\frac{M_{max}}{M_{min}}$$

hence $M_{max}$ equals $2M_{min}$. It is also known that the mean value of $M_{max}$ and $M_{min}$ must be 1. Hence, $$\frac{M_{max}-M_{min}}{2}=1$$

Since for the exemplary nominal velocity ratio of $n=2$, $M_{max}=2M_{min}$ as stated above, it follows that $$\frac{2M_{min}-1M_{min}}{2}=1$$

Accordingly, $M_{min}=\tfrac{2}{3}=.666$, while $$M_{max}=2M_{min}=1.333$$

(Fig. 6).

The respective instantaneous torques in the rotary utility and counter systems may readily be calculated to prove that they are equal and opposed to each other at any instant. To this end, it is necessary to determine the instantaneous accelerations of the driven gears 75 and 76. Dealing first with the pair of gears 74, 75 for the rotary utility system, it is known that the tangential velocity $v'$ of the driving gear 74 is equal to the tangential velocity $v^2$ of the driven gear 75. Hence, $$v'=v^2=r^1\omega_1=r^2\omega_2$$

where $\omega_1$ and $\omega_2$ are angular velocities in radians per time unit of the driving and driven gears 74 and 75, respectively. It is also known that $$M_s = \frac{r^1}{r^2} = \frac{\omega_2}{\omega_1}$$

hence $\omega_2 = M_s \omega_1$. The acceleration of the gear 75 in radians per time unit is $$\alpha_s = \frac{d\omega_2}{dt}$$

(change of angular velocity of gear 75 per time unit), and this is equal to $dM_s\omega_1/dt$. On multiplying this last factor by $\omega_1/\omega_1$ for eventually cancelling out $M_s$ from the final acceleration formula to be used, one obtains $$\frac{dM_s\omega_1}{dt} \times \frac{\omega_1}{\omega_1}$$

and this is equal to $$\frac{dM_s\omega_1}{dt} \cdot \frac{\left(\frac{\omega_1}{d\theta}\right)}{dt}$$

since $\omega_1$ is also equal to $d\theta/dt$ (change of angle $\theta$ per time unit). Thus, $$\alpha_s = \frac{dM_s}{d\theta}\omega_1^2$$

where $$\frac{dM_s}{d\theta} = -(k \text{ sine } \theta)$$

by differentiation of $M_s$ with respect to $\theta$, in accordance with the foregoing equation $M_s = k \text{ cosine } \theta + 1$. Accordingly, the acceleration of the gear 75, and hence of the entire rotary shear system, is $\alpha_s = \omega_1^2(-k \text{ sine } \theta)$. The acceleration of the gear 75, and hence of the entire rotary counter system, is $\alpha_c = \omega_1^2(+k \text{ sine } \theta)$. For the calculation of the accelerations of the gears 75 and 76, and hence of the rotary shear and counter systems, $$\omega_1 = \frac{2\pi No}{60} \text{ radians per second}$$

where $No$ is the input r.p.m. of the drive shaft 37. On thus calculating various instantaneous accelerations of the rotary shear and counter systems, the values thereof in each instance will be found to be exactly alike, but of opposite signs, i.e., in accordance with the acceleration sine curves S and S' of these rotary systems (Fig. 5). Consequently, since the inertias of both rotary systems are made equal, it follows that the torques in both systems are at any instant exactly alike and oppose each other, as desired.

The present gear system 74, 75 and 76, while here shown in an exemplary rotary shear, is, of course, highly useful in many fields for synchronization purposes as well as for other purposes. Even insofar as the present exemplary shear is concerned, the surge gears 74, 75 and 76 and a flywheel 36 of proper inertia could be coupled to the feed rolls 28 instead of to the shear drums, as shown, so as to achieve synchronization by the feed rolls of the linear stock speed with the peripheral drum speed at the moments of cut. Also, quite apart from any synchronization function, the surge gears 74, 75 and 76 will be highly useful for the drive of any type of utility device at a cyclically continuously varying velocity ratio of sufficiently high cyclic frequency that the inevitable torque surges in the utility device and connected driven surge gear would be detrimental.

The profile geometries developed herein for the surge gears 74, 75 and 76 are general in character and apply to gears of any suitable kind, and not only to the preferred gears of spur-type shown. Thus, the profile geometries herein for these surge gears apply to gears of any kind, such as bevel gears, for instance, as long as the center distance $d$ between the gears is measured across the meeting point of the pitch lines of these gears.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A balanced-torque drive for a rotary utility device at continuously varying velocity of a desired maximum to minimum ratio $n$, comprising a spur-type driving gear; two spur-type driven gears in constant mesh with said driving gear, the rotary axes of said driven gears being equally spaced a distance $d$ from, and lying in a common plane with, the rotary axis of said driving gear; and a rotary mass turning with one of said driven gears and the other driven gear turning with said utility device, the pitch line of said driving gear being defined by the ends of radii of said driving gear the lengths of which are equal to $$\frac{d(1+k \text{ cosine } \theta)}{2+k \text{ cosine } \theta}$$

where $\theta$ is the angle of displacement of each of said radii unidirectionally from the radius of maximum length of said driving gear, and $k$ is a constant equal to $$\frac{n-1}{n+1}$$

said driven gears have identical pitch lines each defined by the ends of radii of the respective driven gear which—with respect to their coordinate radii of said driving gear with which they are aligned and continuous once during each revolution of said gears—are of lengths equal to $d$ minus the lengths of their respective coordinate radii; and said driven gears with their respective turning mass and utility device constituting rotary systems, respectively, designed to have equal inertias.

2. A gear system for a balanced-torque drive of two rotary masses of equal inertias at constantly varying velocity of a desired maximum to minimum ratio $n$, comprising a spur-type driving gear; and two spur-type driven gears in constant mesh with said driving gear and adapted for driving connection with said masses, respectively, the rotary axes of said driven gears being equally spaced a distance $d$ from, and lying in a common plane with, the rotary axis of said driving gear, the pitch line of said driving gear being defined by the ends of radii of said driving gear the lengths of which are equal to $$\frac{d(1+ \text{ cosine } \theta)}{2+k \text{ cosine } \theta}$$

where $\theta$ is the angle of displacement of each of said radii unidirectionally from the radius of maximum length of said driving gear, and $k$ is a constant equal to $$\frac{n-1}{n+1}$$

said driven gears have identical pitch lines each defined by the ends of radii of the respective driven gear which—with respect to their coordinate radii of said driving gear with which they are aligned and continuous once during each revolution of said gears—are of lengths equal to $d$ minus the lengths of their respective coordinate radii.

3. A balanced torque drive for a rotary utility device at continuously varying velocity of a desired maximum to minimum ratio $n$, comprising a driving gear; two driven gears in mesh with said driving gear so that the pitch lines of said driven gears meet the pitch line of said driving gear at diametrically opposite points of the pitch line of said driving gear, the rotary axis of each driven gear being spaced from the rotary axis of said driving gear a desired distance $d$ measured across the meeting point of their pitch lines; and a rotary mass turning with one of said driven gears and the other driven gear turning with said utility device, the pitch line of said driving gear being defined by the ends of radii of said driving gear the lengths of which are equal to $$\frac{d(1+ \text{cosine } \theta)}{2+k \text{ cosine } \theta}$$

where $\theta$ is the angle of displacement of each of said radii unidirectionally from the radius of maximum length of said driving gear, and $k$ is a constant equal to $$\frac{n-1}{n+1}$$

said driven gears have identical pitch lines each defined by the ends of radii of the respective driven gear which—with respect to their coordinate radii of said driving gear with which they are continuous once during each revolution of said gears—are of lengths equal to $d$ minus the lengths of their respective coordinate radii; and said driven gears with their respective turning mass and utility device constituting rotary systems, respectively, designed to have equal inertias.

4. A gear system for a balanced-torque drive of two rotary masses of equal inertias at constantly varying velocity of a desired maximum to minimum ratio $n$, comprising a driving gear; and two driven gears in constant mesh with said driving gear and adapted for driving connection with said masses, respectively, the pitch lines of said driven gears meeting the pitch line of said driving gear at diametrically opposite points of the pitch line of said driving gear, the rotary axis of each driven gear being spaced from the rotary axis of said driving gear a distance $d$ measured across the meeting point of their pitch lines, the pitch line of said driving gear being defined by the ends of radii of said driving gear the lengths of which are equal to $$\frac{d(1+ \text{cosine } \theta)}{2+k \text{ cosine } \theta}$$

where $\theta$ is the angle of displacement of each of said radii unidirectionally from the radius of maximum length of said driving gear, and $k$ is a constant equal to $$\frac{n-1}{n+1}$$

said driven gears have identical pitch lines each defined by the ends of radii of the respective driven gear which—with respect to their coordinate radii of said driving gear with which they are continuous once during each revolution of said gears—are of lengths equal to $d$ minus the lengths of their respective coordinate radii.

5. A drive for two rotary masses, comprising a drive shaft, and three gears of which two gears turn with said masses, respectively, and are in mesh with the third gear and the latter turns with said drive shaft, said gears being designed for rotating said masses at continuously varying velocities with said masses having like speed curves of sine form about a line of unity equal to the speed of said drive shaft and 180° out of phase with each other for each revolution of said drive shaft at any given speed of the latter, said two gears having pitch lines identical in outline and size and different in outline from that of the pitch line of said third gear, and said two gears with their respective turning masses having equal inertias.

References Cited in the file of this patent
UNITED STATES PATENTS

| | | |
|---|---|---|
| 114,297 | Ivens et al. | May 2, 1871 |
| 2,180,203 | Hallden | Nov. 14, 1939 |
| 2,788,196 | Jacobi et al. | Apr. 9, 1957 |
| 2,861,635 | Orr | Nov. 25, 1958 |

OTHER REFERENCES

Product Engineering, pp. 19–22, January 1937.